US011120113B2

(12) United States Patent
Sardari et al.

(10) Patent No.: US 11,120,113 B2
(45) Date of Patent: Sep. 14, 2021

(54) AUDIO-BASED DEVICE AUTHENTICATION SYSTEM

(71) Applicant: Electronic Arts Inc., Redwood City, CA (US)

(72) Inventors: Mohsen Sardari, Redwood City, CA (US); Kenneth Alan Moss, Redwood City, CA (US); Kazi Atif-Uz Zaman, Foster City, CA (US); Navid Aghdaie, San Jose, CA (US); John Kolen, Half Moon Bay, CA (US); Mohamed Marwan Mattar, San Francisco, CA (US)

(73) Assignee: ELECTRONIC ARTS INC., Redwood City, CA (US)

(*) Notice: Subject to any disclaimer, the term of this patent is extended or adjusted under 35 U.S.C. 154(b) by 0 days.

(21) Appl. No.: 16/847,263

(22) Filed: Apr. 13, 2020

(65) Prior Publication Data
US 2020/0311239 A1    Oct. 1, 2020

Related U.S. Application Data

(63) Continuation of application No. 15/705,154, filed on Sep. 14, 2017, now Pat. No. 10,621,317.

(51) Int. Cl.
| | |
|---|---|
| *G06F 21/00* | (2013.01) |
| *G06F 21/32* | (2013.01) |
| *G06F 21/83* | (2013.01) |
| *A63F 13/79* | (2014.01) |
| *G06F 3/16* | (2006.01) |
| *A63F 13/25* | (2014.01) |
| *A63F 13/35* | (2014.01) |
| *A63F 13/73* | (2014.01) |

(52) U.S. Cl.
CPC .............. *G06F 21/32* (2013.01); *A63F 13/25* (2014.09); *A63F 13/35* (2014.09); *A63F 13/73* (2014.09); *A63F 13/79* (2014.09); *G06F 3/167* (2013.01); *G06F 21/83* (2013.01)

(58) Field of Classification Search
CPC .......... A63F 13/25; G06F 21/32; G06F 3/167; G06F 21/83
See application file for complete search history.

(56) References Cited

U.S. PATENT DOCUMENTS

| | | | |
|---|---|---|---|
| 7,266,495 B1 | 9/2007 | Beaufays et al. | |
| 7,369,997 B2 | 5/2008 | Chambers et al. | |

(Continued)

FOREIGN PATENT DOCUMENTS

| | | |
|---|---|---|
| JP | 2004-061843 A | 2/2004 |
| KR | 10-2016-0030943 A | 3/2016 |
| WO | WO 2016/111881 A1 | 7/2016 |

*Primary Examiner* — Anthony D Brown
*Assistant Examiner* — Rodman Alexander Mahmoudi
(74) *Attorney, Agent, or Firm* — Knobbe, Martens, Olson & Bear, LLP

(57) ABSTRACT

Embodiments presented herein use an audio based authentication system for pairing a user account with an audio-based periphery computing system. The audio-based authentication system allows a user to interface with the periphery device through a user computing device. The user can utilize a previously authenticated user account on the user computing device in order to facilitate the pairing of the audio-based periphery computing system with the user account.

20 Claims, 5 Drawing Sheets

(56) References Cited

U.S. PATENT DOCUMENTS

| | | |
|---|---|---|
| 7,467,087 B1 | 12/2008 | Gillick et al. |
| 8,443,288 B2 | 5/2013 | Mercs |
| 9,053,479 B1* | 6/2015 | Miller .................. G06Q 20/348 |
| 9,582,246 B2 | 2/2017 | Klein et al. |
| 9,685,156 B2 | 6/2017 | Borjeson et al. |
| 9,741,339 B2 | 8/2017 | Peng et al. |
| 10,134,390 B2 | 11/2018 | Shin |
| 10,152,965 B2 | 12/2018 | Bruguier et al. |
| 10,449,440 B2 | 10/2019 | Sardari et al. |
| 10,586,369 B1 | 3/2020 | Roche et al. |
| 10,600,404 B2 | 3/2020 | Garcia |
| 10,621,317 B1 | 4/2020 | Sardari et al. |
| 10,629,192 B1 | 4/2020 | Streat |
| 2004/0266527 A1 | 12/2004 | Anderson et al. |
| 2006/0040718 A1 | 2/2006 | Davis |
| 2007/0244751 A1 | 10/2007 | Zalewski et al. |
| 2008/0071945 A1* | 3/2008 | Yang ...................... G06F 3/162 710/38 |
| 2008/0147404 A1 | 6/2008 | Liu et al. |
| 2010/0013660 A1* | 1/2010 | Hwang ................ G06F 13/385 340/12.22 |
| 2010/0145704 A1 | 6/2010 | Conkie et al. |
| 2011/0086712 A1 | 4/2011 | Cargill |
| 2011/0212783 A1 | 9/2011 | Dale et al. |
| 2012/0245929 A1* | 9/2012 | Shibuya .................. H04R 3/00 704/211 |
| 2013/0031275 A1 | 1/2013 | Hanes |
| 2013/0090169 A1 | 4/2013 | Liu et al. |
| 2013/0315406 A1 | 11/2013 | Choi et al. |
| 2013/0325474 A1 | 12/2013 | Levien et al. |
| 2014/0128144 A1 | 5/2014 | Bavitz et al. |
| 2014/0163980 A1 | 6/2014 | Tesch et al. |
| 2014/0164507 A1 | 6/2014 | Tesch et al. |
| 2014/0181929 A1 | 6/2014 | Zheng et al. |
| 2015/0012277 A1 | 1/2015 | Stephens, Jr. |
| 2015/0019216 A1 | 1/2015 | Singh et al. |
| 2015/0019540 A1 | 1/2015 | Ganjam et al. |
| 2015/0035937 A1 | 2/2015 | Ota |
| 2015/0111640 A1 | 4/2015 | Zheng |
| 2015/0128026 A1 | 5/2015 | Mori et al. |
| 2015/0248886 A1 | 9/2015 | Sarikaya et al. |
| 2015/0310854 A1 | 10/2015 | Takemura et al. |
| 2015/0310897 A1 | 10/2015 | Ko et al. |
| 2015/0324458 A1 | 11/2015 | Kurisu et al. |
| 2015/0347912 A1 | 12/2015 | Rodzevski et al. |
| 2016/0203002 A1 | 7/2016 | Kannan et al. |
| 2016/0261425 A1* | 9/2016 | Horton ............... G05D 23/1917 |
| 2017/0052760 A1 | 2/2017 | Johnson et al. |
| 2017/0110128 A1 | 4/2017 | Zhang et al. |
| 2017/0169829 A1 | 6/2017 | Celikyilmaz et al. |
| 2017/0171594 A1 | 6/2017 | Huang et al. |
| 2017/0177140 A1 | 6/2017 | Lee |
| 2017/0178622 A1 | 6/2017 | Ishikawa et al. |
| 2017/0193992 A1 | 7/2017 | Wang et al. |
| 2017/0337542 A1* | 11/2017 | Kim .................... G06Q 20/367 |
| 2018/0068656 A1 | 3/2018 | Lehman et al. |
| 2018/0243657 A1 | 8/2018 | Kulavik |
| 2018/0286276 A1 | 10/2018 | Lee et al. |
| 2019/0009181 A1 | 1/2019 | Kroyan et al. |
| 2019/0027131 A1 | 1/2019 | Zajac, III |
| 2019/0043474 A1 | 2/2019 | Kingsbury et al. |
| 2019/0103106 A1 | 4/2019 | Boeda et al. |
| 2020/0101383 A1 | 4/2020 | Hwang et al. |
| 2020/0129851 A1 | 4/2020 | Sardari et al. |
| 2020/0251089 A1 | 8/2020 | Pinto |

\* cited by examiner

AUDIO-BASED DEVICE AUTHENTICATION SYSTEM

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

Users can have many different computing devices and user accounts. Many times a user will login to a user account on each computing device. In some instances, multiple devices can use the same user accounts. It can be a laborious process for a user to constantly login to user accounts on each device they own. Some devices can have difficult interfaces that are cumbersome, non-intuitive, or in some instances no user interfaces at all, such as audio-based devices.

SUMMARY OF CERTAIN EMBODIMENTS

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

One embodiment discloses a computer-implemented method comprising: as implemented by a user computing device configured with specific computer-executable instructions, receiving a request to initiate a pairing between a periphery computing device with a user account associated with a video game application, the user account previously authenticated on the user computing device; outputting a first audio output from an audio output system of the user computing system in response to the request to pair the periphery computing device with the user account, the first audio output configured to request identification data from the periphery device; receiving a second audio output from the periphery computing device, responsive to the first audio output, the second audio output comprising identification data identifying the periphery computing device; transmitting, over a network, an authentication request data packet to a remote authentication manager, for a pairing between the periphery computing device and a user account; receiving, over the network, an authentication response data packet from the remote authentication manager, the authentication response data packet comprising an authentication token for the periphery computing device; outputting a third audio output from the audio output system of the user computing system, the third audio output comprising the authentication token and authentication access information, wherein the periphery computing device is configured to communication with the remote authentication server using the authentication access information and pair the periphery computing device using the authentication token; and receiving, over the network, a confirmation data packet from the remote authentication manager, the confirmation data packet indicating pairing of the periphery computing device and the user account is complete.

Another embodiment discloses a system comprising: one or more hardware processors, the one or more hardware processors configured to execute specific computer-executable instructions to at least: receive a request to initiate a pairing between a periphery computing device with a user account associated with a video game application, the user account previously authenticated on the user computing device; output a first audio output from an audio output system of the user computing system in response to the request to pair the periphery computing device with the user account, the first audio output configured to request identification data from the periphery device; receive a second audio output from the periphery computing device, responsive to the first audio output, the second audio output comprising identification data identifying the periphery computing device; transmit, over a network, an authentication request data packet to a remote authentication manager, for a pairing between the periphery computing device and a user account; receive, over the network, an authentication response data packet from the remote authentication manager, the authentication response data packet comprising an authentication token for the periphery computing device; output a third audio output from the audio output system of the user computing system, the third audio output comprising the authentication token and authentication access information, wherein the periphery computing device is configured to communication with the remote authentication server using the authentication access information and pair the periphery computing device using the authentication token; and receive, over the network, a confirmation data packet from the remote authentication manager, the confirmation data packet indicating pairing of the periphery computing device and the user account is complete.

Another embodiment discloses a non-transitory computer-readable storage medium storing computer executable instructions that, when executed by one or more computing devices, configure the one or more computing devices to perform operations comprising: as implemented by a user computing device configured with specific computer-executable instructions, receiving a request to initiate a pairing between a periphery computing device with a user account associated with a video game application, the user account previously authenticated on the user computing device; outputting a first audio output from an audio output system of the user computing system in response to the request to pair the periphery computing device with the user account, the first audio output configured to request identification data from the periphery device; receiving a second audio output from the periphery computing device, responsive to the first audio output, the second audio output comprising identification data identifying the periphery computing device; transmitting, over a network, an authentication request data packet to a remote authentication manager, for a pairing between the periphery computing device and a user account; receiving, over the network, an authentication response data packet from the remote authentication manager, the authentication response data packet comprising an authentication token for the periphery computing device; outputting a third audio output from the audio output system of the user computing system, the third audio output comprising the authentication token and authentication access information, wherein the periphery computing device is configured to communication with the remote authentication server using the authentication access information and pair the periphery computing device using the authentication token; and receiving, over the network, a confirmation data packet from the remote authentication manager, the confirmation data packet indicating pairing of the periphery computing device and the user account is complete.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Introduction

Figure 1:
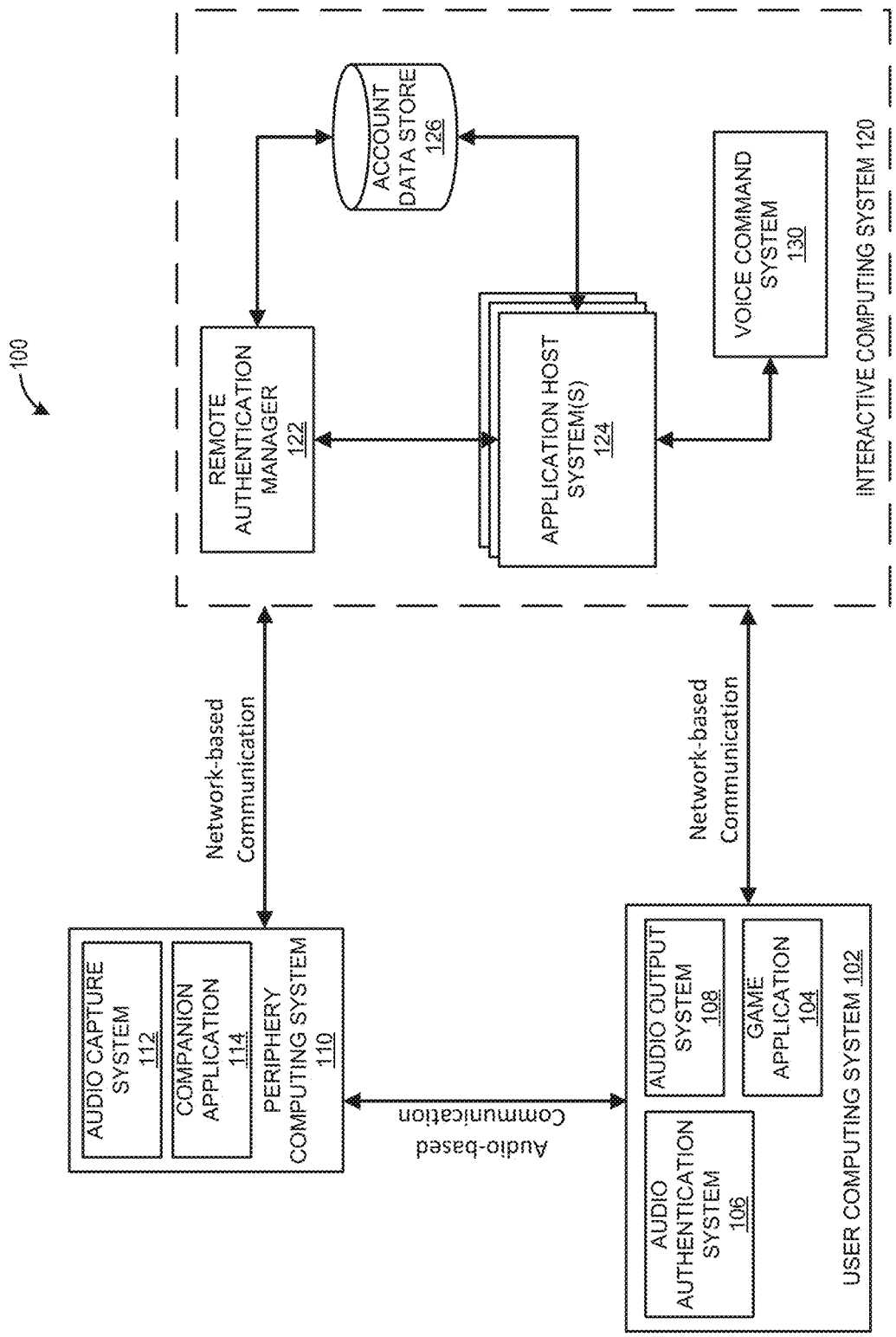
FIG. 1 illustrates an embodiment of a networked computing environment that can implement one or more embodiments of an audio authentication system.

Embodiments presented herein use an audio based authentication system for pairing a user account with an audio-based periphery computing system. The audio-based authentication system allows a user to interface with the periphery device through a user computing device. The user can utilize a previously authenticated user account on the user computing device in order to facilitate the pairing of the audio-based periphery computing system with the user account.

An audio authentication system can be configured to pair a periphery computing device with a user account. The audio authentication system can be configured to receive login credentials from the user to login to the user account. After the user has logged into the user account, the audio authentication system can initiate a process for pairing the user account with the periphery computing device. The audio authentication system can be configured engage in a series of audio-based communications with the periphery computing device and a series of network-based communications with the remote authentication manager in order to pair the user account with the periphery computing device.

The remote authentication manager can generate an authentication token for the periphery computing device in response to a request from the audio authentication system. A companion application 114 can be installed on the periphery computing device and configured to handle authentication of the periphery computing device with the remote authentication manager. The companion application can receive audio authentication data from the user computing system. The audio authentication data can include an authentication token and authentication access information that can be used by the companion application to communicate over a network with the remote authentication manager and the interactive computing system. The companion application can engage in the handshaking and secret sharing routines in order to authenticate the periphery computing device with the remote authentication manager and pair the companion application with the user account.

After completion of the pairing process, the periphery computing device can interface directly with the interactive computing system without communicating with the user computing system. The periphery computing device can provide voice commands to the voice command system of the interactive computing system through the companion application. The companion application enables a user to interact with at least a portion of the video game without executing the video game itself. For example, the companion application enables a user to make changes to a user's character or team, buy or sell digital items that the user may use when playing the video game, instruct a user's character or team to take an action or to travel to a location within the video game, or to assign skill points earned in the video game to different aspects of an in-game character. Further, the user can use the companion application to obtain information about the video game, such as the status of the user's character, a list of available missions, or the number of users currently playing the video game or currently playing the video game in a particular host server.

To simplify discussion, the present disclosure is primarily described with respect to an authentication system for an account-based video game system. However, the present disclosure is not limited as such and may be applied to other types of applications. For example, embodiments disclosed herein may be applied for audio-based authentication for any type of user accounts and or applications where audio-based authentication needs to be performed.

Example Networked Computing Environment

FIG. 1 illustrates an embodiment of a networked computing environment 100 that can implement one or more embodiments of an audio-based authentication system. The networked computing environment 100 includes a user computing system 102 that can communicate with an interactive computing system 120 using network-based communication and a periphery computing system that can communicate with an interactive computing system 120 using network-based communication. The periphery computing system 110 and the user computing system 102 can communicate with each other using audio-based communication.

User Computing System

The user computing system 102 may include, host, or execute a game application 104. The computing system 102 can execute a game application 140, also referred to as a video game application or video game. The user computing system can also include an audio authentication system 106 and an audio output system 108. The computing system 102 can include a central processing unit (CPU), a graphics processing unit (GPU), a data store, and other computing components. The computing system 102 may be implemented on a computing device such as the computing device 102 illustrated in FIG. 5. The computing system 102 may be in communication with the interactive computing system 120. For example, the interactive computing system 120 can communicate updates of the game application 104 to the computing system 102. The computing system 102 may use the CPU, the GPU, and the data store to execute a game application 104.

The computing system 102 may include hardware and software components for establishing communications over a communication network. For example, the computing system 102 may be equipped with networking equipment and network software applications (for example, a web browser) that facilitates communications via one or more networks (for example, the Internet or an intranet).

Game Application

The computing system 102 may execute a game application 104. The game application 104 may be an offline game which can be run locally on the computing system 102. The game application 104 may also be an online game which can involve communications among multiple computing systems. The computing system 102 can execute a game application 104 that may be stored and/or executed in a distributed environment. For example, the computing system 102 may execute a portion of a game and the interactive computing system 120, or an application host system 124 of the interactive computing system 120 may execute another portion of the game. For instance, the game may be a massively multiplayer online role-playing game (MMORPG) that includes a client portion executed by the computing system 102 and a server portion executed by one or more application host systems 124. For the present discussion, the game application 104 can include a distributed application or an application that includes a portion that executes on the computing system 102 and a portion that executes on at least one of the application host systems 124. Detailed elements of the game application 104 are further described with reference to the game system 200 in FIG. 2. The computing system 102 can communicate with the interactive computing system 120 via a network.

Audio Authentication System

The audio authentication system 106 can execute within the game application 104 or execute as a separate application on the user computing system. The audio authentication system 106 can be loaded into memory on the user computing system 102 and can act as an interface or hub for one or more game applications 104 that interfaces with the application host system 122. The audio authentication system 106 can be configured to pair a periphery computing device 110 with a user account, a game application 104, or game account. A user can login to the user account on the interactive computing system each time a game application 104 is executed. The user account can be associated with a plurality of different game applications 104. The user account may include user account information (such as username, display name, email domains, date of birth, answers to security questions), user authentication information (such as, username and password), game profile information (such as, for example, settings of multiple in-game user profiles), save game files, characteristics associated with in-game characters (such as, for example, character equipment, character level, achievements, and the like), or other information. The user account information can be stored on the interactive computing system, such as in data store 124. In some embodiments, a portion of the user account information may be stored locally on the user computing system 102. In some embodiments, the user can have a single user account associated with the interactive computing system 120 that includes a plurality of game applications associated with the interactive computing system 120. In some embodiments, the user can have a different user account associated with each game application 104.

The audio authentication system 106 can be configured to receive login credentials from the user to login to the user account. After the user has logged into the user account, the audio authentication system 106 can initiate a process for pairing the user account with the periphery computing device 110. The audio authentication system 106 can be configured engage in a series of audio-based communications with the periphery computing device 110 and a series of network-based communications with the remote authentication manager 122 in order to pair the user account with the periphery computing device 110. The audio authentication system 106 can provide a user interface that a user can access to initiate and confirm pairing of the user account with the periphery computing device 110. The audio authentication system 106 can be configured to generate instructions for the AOS in order to generate an audio output in order to transfer data from the user computing system 102 to the periphery computing device 110. The audio output can be based on the information received from the remote authentication manager 122. For example the audio authentication system 106 can provide instructions to the AOS to transmit an authentication token to the periphery computing device 110 in order for the periphery computing device 110 to authenticate with the remote authentication manager 122. The audio authentication system 106 can generate instructions to the audio output system to output utterances or sounds for communicating data to the periphery computing device 110. The audio authentication system 106 can embed data in the sound waves using modulation (such as, amplitude modulation, frequency modulation, pulse modulation, or phase modulation). The data can be provided at audible or inaudible frequencies of sound waves. For example, the audio output system 108 can generate an audible melody and embed the data in inaudible frequencies while the melody is playing or embed the data in audible frequencies that are not recognizable to the ear.

Audio Output System

The audio output system 108 can include one or more audio output device that are configured to output sound, such as a speaker or other audio output device. The audio output system can receive instructions from the audio authentication system 106 and generate an audio output including audio data for communication to the periphery computing device 110. The audio output system 108 can also include one or more audio input devices for receiving audio information, such as a microphone. The audio input device can be used to receive information communicated from the periphery computing device 110 to the user computing system 102.

Periphery Computing System

The periphery computing system 110 is an audio-based computing device configured to respond to audio input provided to the periphery computing device 110, such as, for example, a Google® Home device or other audio-based computing device. The periphery computing system 110 can also be referred to as a periphery device. The periphery computing device 110 can include an audio capture system 112 and can be configured to install and execute the one or more companion applications 114. The periphery computing device 110 can include a central processing unit (CPU), a data store 116, and other hardware and software computing components. The periphery computing system 110 may include hardware and software components for establishing communications over a communication network. For example, the computing system 110 may be equipped with networking equipment and network software applications that facilitates communications via one or more networks (for example, the Internet or an intranet).

Audio Capture System

The periphery computing system 110 includes an audio capture system 112 that can capture one or more utterances or sounds made by the audio output system 108 or another audio source, such as a user interacting with the user computing system 102. The audio capture system 112 may capture utterances or sounds from one or more audio input devices, such as microphones. The term "utterance" can refer to understandable sounds generated by a human or an audio output system (such as a speaker). The audio capture system 112 may convert the one or more utterances into one or more words, commands, or speech. The words may be in one or multiple languages. Further, the words may include fictitious words that are associated with the game application 104. The audio capture system may capture and convert sounds that are understandable by a computing system but would be unintelligible to a human, such as a coded modulation of data transmitted over sound waves and generated by a computing system (such as, the audio output system 108). In some embodiments, the audio capture system 112 may interact with a cloud or network-based system to facilitate recognizing utterances. For example, the audio capture system 112 may interact with a voice recognition system that can convert a captured utterance into one or more words. The audio capture system 112 may receive, via a microphone, utterances or audio. In some cases, the captured audio may be processed by the companion application 114, or by an audio processing system on the periphery computing system 110.

Companion Application

The companion application 114 provides an audio-based application that enables a user to interact with the interactive computing system 120 and/or a game application, such as the game application 104 without directly executing the game application 104. For example, the companion application 114 may enable a user to access an auction house associated with the video game. As another example, the companion application 114 may enable a user to trade characters, obtain in game items, sell in game items, reconstitute a user's character squad, obtain tips or advice for playing the video game, obtain game news, subscribe to missions within the game, or perform any other action or query that may be performed without the user accessing an instance of the video game itself. Some of the interactions may not require interacting with the game application 104 itself, but may provide information about the game application 104 or may interact with other applications that can affect the play of the game application 104. The companion application 114 may not be a game itself, but may be capable of providing information about a game application 104 or the ability to make changes to elements of the game application 104. In other embodiments, the companion application 114 may include game features. For example, the companion application 114 may provide access to mini games whose outcomes may or may not affect the game application 104. The companion application can be downloaded and installed on the periphery computing device 110 from a third party application provider. For example, a digital application provider may host the companion application for download. The digital application provider may be the manufacturer of the periphery computing device 110. In some embodiments, the companion application may be downloaded directly from the interactive computing system 120.

The companion application 114 can be configured to handle authentication of the periphery computing device 110 with the remote authentication manager 122. The companion application can receive audio authentication data from the user computing system 102. The audio authentication data can include an authentication token and authentication access information that can be used by the companion application 114 communicate over a network with the remote authentication manager 122 and the interactive computing system 120. The companion application 114 can engage in the handshaking and secret sharing routines in order to authenticate the periphery computing device 110 with the remote authentication manager 122 and pair the companion application 114 with the user account. The authentication and pairing of the companion application 114 with the user account through the remote authentication manager 122 is performed independently from the user computing system 102. In other words, the authentication and pairing process between the remote authentication manager 122 and the periphery computing device 110 does not involve communications with the user computing system 102 after receiving the audio authentication data token from the user computing system 102.

Interactive Computing System

The interactive computing system 120 may include a remote authentication manager 122, application host systems 124, an account data store 126, and a voice command system 130. The interactive computing system 120 or parts thereof may a computing device such as the user computing system 10 in FIG. 5.

Application Host Systems

As described with reference to the computing system 110, the application host systems 124 can host at least a portion of the game application 120. The application host systems 124 can be configured to execute a portion of the game application 120. In certain embodiments, instead of or in addition to executing a portion of the game application 120 and/or game engine 124, the application host systems 122 may execute another application, which may complement and/or interact with the game application 120 during the execution of an instance of the game application 120.

The interactive computing system 120 may enable multiple players or computing systems to access a portion of the game application 104 executed or hosted by the interactive computing system 120. In some embodiments, the portion of the game application 104 executed by application host systems 124 of the interactive computing system 120 may create a persistent virtual world. This persistent virtual world may enable one or more players to interact with the virtual world and with each other in a synchronous and/or asynchronous manner. In some embodiments, the application host systems 124 may execute a hosting system for executing various aspects of a game environment. For example, in one embodiment, the game application 104 may be a competitive game, such as a first person shooter or sports game, and the application host systems 124 can provide a dedicated hosting service for hosting multiplayer game instances or facilitate the creation of game instances hosted by player computing devices. In some embodiments, the application host systems 124 can provide a lobby or other environment for players to virtually interact with one another. Such environments may include environments for conducting transactions between players, such as an auction house or type of environment for facilitating transactions.

Data Store

The interactive computing system 120 can include one or more data stores 126. The one or more data stores 126 can be configured store information associated with the game application, such as a virtual environment of the game application 104, game rules, as well as assets in the game application 104, such as graphical appearances and animations of game characters. The one or more data stores 126 can be configured to store user account information associated with game applications hosted by the interactive computing system 120 and/or the application host systems 124.

Remote Authentication Manager

The interactive computing system 120 can include a remote authentication manager 122 which can be configured to communicate with the user computing system 102 and the periphery computing device 110 in order to perform authentication functions in accordance with the embodiments described herein. For example, the remote authentication manager 122 can be configured to authenticate a user login on the user computing system 102. The remote authentication manager 122 can be further configured to generate and provide an authentication token for a periphery computing device 110 in response to a request from the user computing system 102. The remote authentication manager 122 can be configured to pair the periphery computing device 110 with a user account with the interactive computing system 120. The remote authentication manager 122 can manage expiry times of authentication tokens.

Voice Command System

The interactive computing system 120 can include a voice command system 130. The voice command system 130 can be configured to perform actions based on audio captured by the audio capture system 112. The audio captured by the audio capture system can be used to perform various actions associated with a user account, a game application 104, an application host system 124, or the companion application 114 as further described herein with reference to FIG. 4.

Embodiments of an Audio-Based Authentication Process

Figure 2:
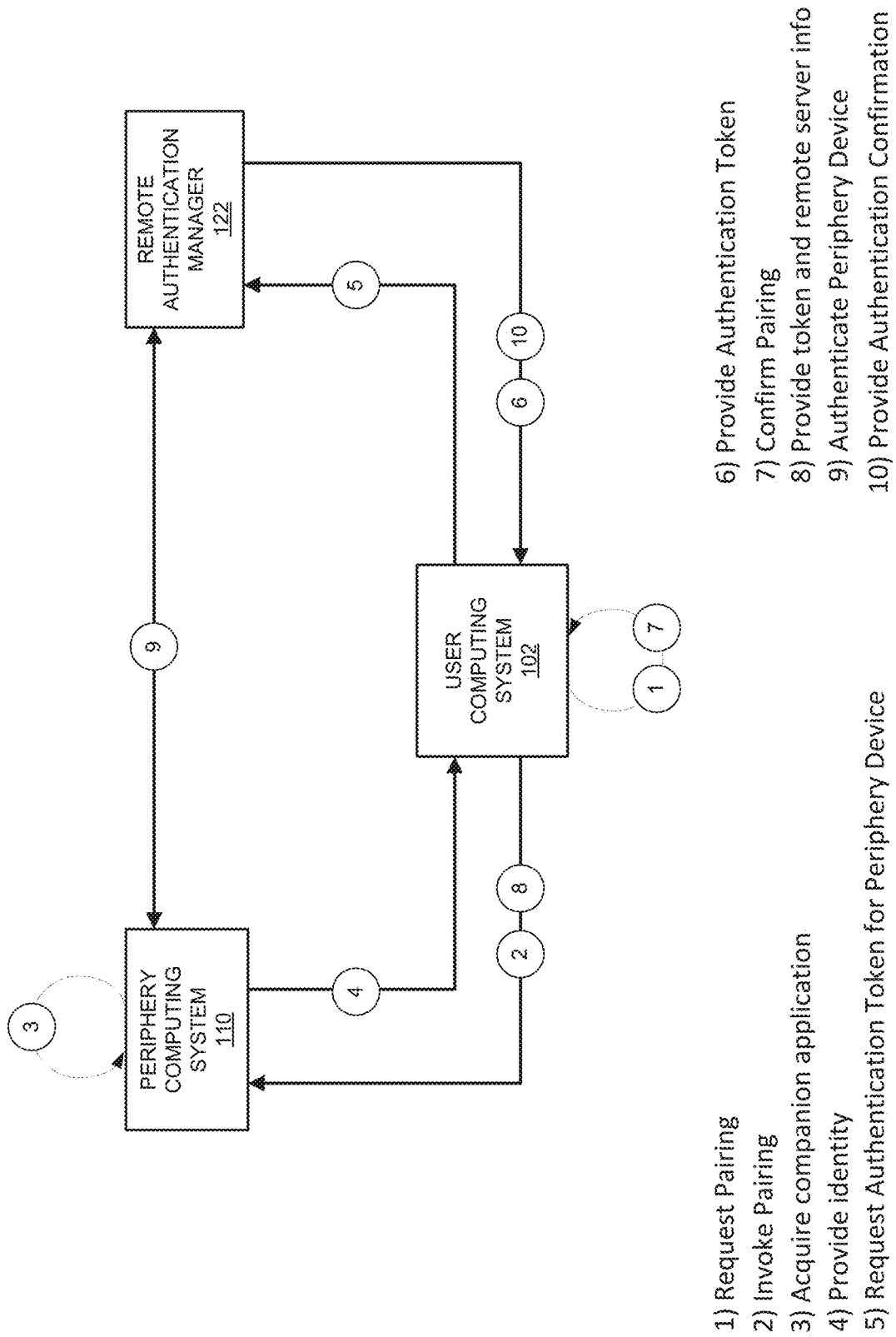
FIG. 2 provides an embodiment of state diagram for a process for audio-based authentication.

FIG. 2 depicts a block diagram of an embodiment illustrating various interactions between systems associated with an audio-based authentication routine. FIG. 2 depicts interactions between the user computing system 102, the periphery computing system 110, and the remote authentication manager 122. The interactions between the user computing system 102 and the PCS use audio-based communication. The interactions between the user computing system 102 and the remote authentication manager 122 use network-based communication. The interactions between the periphery computing device 110 and the remote authentication manager 122 use network-based communication.

At (1), a user on of the user computing system 102 requests pairing between the periphery computing device 110 and a user account associated with the user. A user on the user computing system 102 can navigate within game application 104 or the audio authentication system 106 in order to initiate the pairing operation with the periphery computing device 110. The user account identified for pairing can be a user account that the user has already logged into on the user computing system 102 or within the game application. For example, the user may have already accessed the user account by providing login credentials (for example, username and password) associated with a user account. The user account can be stored on the interactive computing system, such as in the data store 126. The user can login into the user account on the interactive computing system 120 through the game application.

At (2) the user computing system 102 initiates the pairing of the periphery computing device 110 with the user account. After receiving the request from the user, the audio authentication system 106 can generate an audio output, which can be output by the audio output system 108, for initiating communication with the periphery computing device 110. The audio authentication system 106 can generate the audio output through the audio output system 108 based on specific audio communication requirements associated with type of periphery computing device 110. For example, different types of periphery computing device 110s may have different requirements for initiating communication between the audio authentication system 106 and the periphery computing device 110. In some embodiments, the user may be required to identify the type of periphery computing device 110. The audio output can be a series of sounds or utterances output by the audio output system on the user computing system 102. The utterances can be in the form of words, phrases, or commands. The sounds may be an encoded modulation of audible or inaudible sound waves output in a defined frequency domain. The audio output may also include a request for information from the periphery computing device 110 that triggers the periphery computing device 110 to respond. For example, the request for information can be a request output the identity of the periphery computing device 110 and an acknowledgement that that the companion application 114 has been installed on the periphery computing device 110.

At (3), the periphery computing device 110 can use the audio data provided by the user computing system 102 in order to install the companion application 114. The audio output provided to the periphery computing device 110 can provide instructions that enable the periphery computing device 110 to initiate the process for installing the companion application 114 on the periphery computing device 110. The audio data provided by the user computing system 102 to the periphery computing device 110 can identify the companion application in such a manner that the periphery computing device 110 can access the companion application 114. The periphery computing device 110 can use the companion application 114 identification data to download and install the companion application 114 from a designated location, such as, for example, a digital application marketplace or the interactive computing system 120. The digital application marketplace may be the manufacturer of the periphery computing device 110.

At (4) the periphery computing device 110 provides a response to the user computing system 102, the user computing system 102 can include identification data of the periphery computing device 110 to the user computing system 102. In certain embodiments, the identification data of the periphery computing device 110 may include information such as a make, model number, serial number or other unique identifier, and or other information associated with the identity of the periphery computing device 110. The periphery computing device 110 may provide an indication of whether the companion application 114 has been installed on the periphery computing device 110. The periphery computing device 110 may also provide additional information to the user computing system 102 associated with the companion application. In some embodiments, the operating system of the periphery computing device 110 can be configured to respond and provide the identification data. After the companion application 114 is installed, the companion application 114 can provide an indication to the user computing system 102 that the installation is complete. After installation, the companion application 114 can complete the steps in the authentication routine for the periphery computing device 110.

At (5) the user computing system 102 communicates the request for pairing the user account with the periphery computing device 110 to the remote authentication manager. The user computing system 102 communicates with the remote authentication manager 122 over a network and request an authentication token for the periphery computing device 110. The request can include at least a portion of the periphery computing device 110 identity data and user account identity information. The request can include more or less information associated with the user account and/or the periphery computing device 110, as required by the remote authentication manager 122, such that the remote authentication manager 122 can generate an authentication token for the periphery computing device 110. In some embodiments, the remote authentication manager 122 can access information from a data store, such as the account data store 126 in order to generate the authentication token.

At (6), the remote authentication manager 122 can generate and provide the authentication token to the user computing system 102. The generated authentication can be an authentication token generated by the remote authentication manager 122 that can only be used by the identified periphery computing device 110. In some embodiments, a one-time use authentication token can be generated that expires after defined time period. The time period can be relatively short, such as, for example, 15 minutes or one hour. In some embodiments, the token is associated with the user account but can be used by any periphery computing device 110 in order to engage in an authentication routine between the remote authentication manager 122 and the periphery computing device 110. The authentication token can be an alphanumeric code comprising a plurality of numbers and/or letters of a defined length. In some embodiments, the authentication token can be the same token associated with the authenticated login of the user account by the user computing system 102. In some embodiments, the authentication token can be different than the authentication token used by the user account.

At (7), the user computing system 102 can confirm with the user that that the user would like to pair the user account with the periphery computing device 110. In some embodiments, the user computing system 102 may provide a user interface that displays the received authentication token and the identity of the periphery computing device 110 to the user. The user can then confirm that the periphery computing device 110 is the correct device. In some embodiments, the user may confirm the pairing process at different or additional points within the authentication process. For example, the confirmation may occur after receiving the identity of the periphery computing device 110 and prior to requesting the authentication token from the remote authentication manager 122.

At (8) the user computing system 102 can generate an audio output configured to transmit authentication data to the periphery computing device 110. The authentication data can include the authentication token and authentication access information. Prior to transmitting the authentication data, the user computing system 102 may initiate communication with the periphery computing device 110 by using a defined tone or sound, which indicates to the periphery computing device 110 that the transfer of data will begin. The audio output including the authentication data can be in the form of words (such as utterances including numbers and/or letters of the authentication token) or may be in the form of audio data embedded in the sound waves using modulation (such as, amplitude modulation, frequency modulation, or phase modulation). The authentication data can be provided at audible or inaudible frequencies of sound waves. The data provided to the periphery computing device 110 can include the authentication token and authentication access information for use by the periphery computing device 110 to complete the authentication and pairing process. For example, the authentication access information can be a uniform resource identifier (URI) that the periphery computing device 110 can use in order to communicate with the remote authentication manager 122.

At (9), the periphery computing device 110 can use the authentication access information provided by the user computing system 102 in order to communication with the remote authentication manager 122. In some embodiments, the authentication access information can provide the periphery computing device 110 with a redirect path for registering the authentication token with the remote authentication manager 122. The periphery device can register the authentication token in a cloud-based data store, such as data store 126, in order to complete authentication of the periphery device. In some embodiments, authentication access information can be used to communicate a single use authentication to the remote authentication manager 122. The periphery computing device 110 can provide the authentication token to the remote authentication manager 122 during a handshaking routine. The periphery computing device 110 can engage with the remote authentication manager 122 in a handshaking routine in order to securely communicate the authentication token to the remote authentication manager 122. The remote authentication manager 122 can validate the one-time use authentication token and generate a new token for pairing the periphery computing device 110 with the user account. The new authentication token received from the remote authentication manager 122 can have a defined expiry time. The defined expiry time can be two weeks, three months, one year, or any other defined expiration time. The companion application 114 can be configured to engage in the handshaking and authentication process for the periphery computing device 110. After the authentication and process is complete, the periphery computing device 110 can communicate directly with the interactive computing system 120 in order to transfer voice commands to the voice command system 130, as further described with respect to FIG. 4. The periphery computing device 110 does not need to engage in further audio communication in order for the periphery computing device 110 to interact with the user account and the interactive computing system 120.

At (10), the remote authentication manager 122 can communicate with the user computing system 102 that the authentication routine has been completed. The UI of the user computing system 102 can be updated to indicate that the pairing process is complete. In some embodiments, the periphery computing device 110 may provide an audible indication that the authentication and pairing process is complete.

After authentication, the user account can remain paired to the periphery computing device 110 for a defined period of time. After the defined period of time, the authentication token will expire and the user account will no longer be paired with the periphery computing device 110. For example, the authentication token may have an expiry time set for two weeks, one month, three months, or any other defined time period. After the expiration of the token, the periphery computing device 110 will need to engage in the same authentication process described above. In some embodiments, the expiry time will reset each time a user interfaces with the user account through the periphery computing device 110. In such a case, the expiry may be shortened. For example, the token may be configured to expire after the user has not interfaced with the companion application for one week. If the user account interacts with the companion application on the periphery computing device 110, the expiry time resets.

Example Audio-Based Authentication Process

Figure 3:
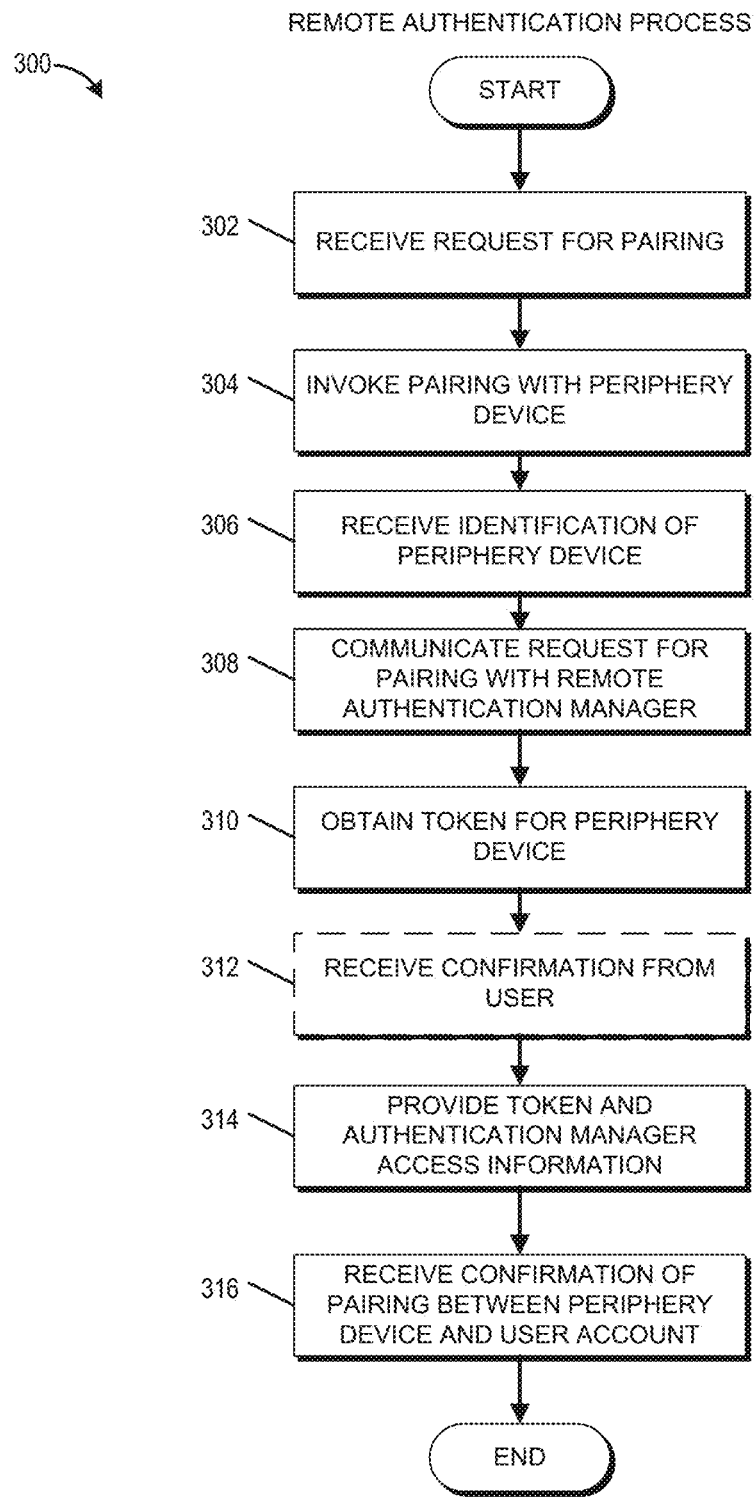
FIG. 3 presents a flowchart of an embodiment of an audio-based authentication process.

FIG. 3 presents a flowchart of an embodiment of a process for an audio-based authentication process 300. The process 300, in whole or in part, can be implemented by, for example, a user computing system 102, a game application, audio authentication system 106, an audio output system 108, a periphery computing system 110, an audio capture system 112, a companion application 114, an interactive computing system 120, and a remote authentication manager system 122, among others. Although any number of systems, in whole or in part, can implement the process 300, to simplify discussion, the process 300 will be described with respect to particular systems. Further, it should be understood that the process 300 may be repeated each time authentication of the periphery computing system is required.

The process 300 begins at block 302 where the user computing system 102 receives a request for pairing between a user account and a periphery computing device 110. A user on the user computing system 102 can navigate within game application 104 or the audio authentication system 106 in order to initiate the pairing operation with the periphery computing device 110. The user account identified for pairing can be a user account that the user has already logged into on the user computing system 102 or within the game application. For example, the user may have already accessed the user account by providing login credentials (for example, username and password) associated with a user account. The user account can be stored on the interactive computing system, such as in the data store 126. The user can login into the user account on the interactive computing system 120 through the game application.

At block 304, the user computing system can invoke the pairing process with the periphery computing device 110. After receiving the request from the user, the audio authentication system 106 can generate an audio output, which can be output by the audio output system 108, for initiating communication with the periphery computing device 110. The audio authentication system 106 can generate the audio output through the audio output system 108 based on specific audio communication requirements associated with type of periphery computing device 110. For example, different types of periphery computing device 110s may have different requirements for initiating communication between the audio authentication system 106 and the periphery computing device 110. In some embodiments, the user may be required to identify the type of periphery computing device 110. The audio output can be a series of sounds or utterances output by the audio output system on the user computing system 102. The utterances can be in the form of words, phrases, or commands. The sounds may be an encoded modulation of audible or inaudible sound waves output in a defined frequency domain. The audio output provided to the periphery computing device 110 can provide instructions that enable the periphery computing device 110 to initiate the process for installing the companion application 114 on the periphery computing device 110. The audio data provided by the user computing system 102 to the periphery computing device 110 can identify the companion application in such a manner that the periphery computing device 110 can access the companion application 114. The audio output may also include a request for information from the periphery computing device 110 that triggers the periphery computing device 110 to respond. For example, the request for information can be a request output the identity of the periphery computing device 110 and an acknowledgement that that the companion application 114 has been installed on the periphery computing device 110.

At block 306, the user computing system 102 receives a response from the periphery computing device 110 providing identification data of the periphery computing device 110. In certain embodiments, the identification data associated with the periphery computing device 110 may include information such as a make, model number, serial number or other unique identifier, and or other information associated with the identity of the periphery computing device 110. The periphery computing device 110 may provide an indication of whether the companion application 114 has been installed on the periphery computing device 110.

At block 308, the user computing system 102 communicates the request for pairing the user account with the periphery computing device 110 to the remote authentication manager. The user computing system 102 communicates with the remote authentication manager 122 over a network and request an authentication token for the periphery computing device 110. The request can include at least a portion of the periphery computing device 110 identity data and user account identity information. The request can include more or less information associated with the user account and/or the periphery computing device 110, as required by the remote authentication manager 122, such that the remote authentication manager 122 can generate an authentication token for the periphery computing device 110. In some embodiments, the remote authentication manager 122 can access information from a data store, such as the account data store 126 in order to generate the authentication token.

At block 310, the user computing system 102 can receive the authentication token for the periphery computing device 110 generated by the remote authentication manager 122. The generated authentication can be an authentication token generated by the remote authentication manager 122 that can only be used by the identified periphery computing device 110. In some embodiments, the token is associated with the user account but can be used by any periphery computing device 110 in order to engage in an authentication routine between the remote authentication manager 122 and the periphery computing device 110. In some embodiments, the authentication token can be an alphanumeric code comprising a plurality of numbers and/or letters. In some embodiments, the authentication token can be a one-time access token that is only used during the pairing process.

At block 312, the user computing system 102 can generate a user interface requesting confirmation that the user would like to proceed with pairing the user account with the periphery computing device 110. In some embodiments, the user computing system 102 may provide a user interface that displays the received authentication token to the user and the identity of the periphery computing device 110 to the user. The user can then provide input confirming that the periphery computing device 110 is the correct device. In some embodiments, the user may confirm the pairing process after block 306 and prior to block 308.

At block 314, the user computing system 102 can generate an audio output configured to transmit authentication data to the periphery computing device 110. The authentication data can include the authentication token and authentication access information. Prior to transmitting the authentication data, the user computing system 102 may initiate communication with the periphery computing device 110 by using a defined tone or sound, which indicates to the periphery computing device 110 that the transfer of data will begin. The audio output including the authentication data can be in the form of words (such as utterances including numbers and/or letters of the authentication token) or may be in the form of audio data embedded in the sound waves using modulation (such as, amplitude modulation, frequency modulation, or phase modulation). The authentication data can be provided at audible or inaudible frequencies of sound waves. The data provided to the periphery computing device 110 can include the authentication token and authentication access information for use by the periphery computing device 110 to communicate with the remote authentication manager 122. For example, the authentication access information can be a uniform resource identifier (URI) that the periphery computing device 110 can use in order to communicate with the remote authentication manager 122. The periphery computing device 110 uses the authentication data in order to communicate with the remote authentication manager 122 over a network and pair the periphery computing device 110 with the user account. The periphery computing device 110 can engage in a handshaking routine in order to securely communicate the authentication token to the remote authentication manager 122. The remote authentication manager 122 can validate the authentication token and pair the periphery computing device 110 with the user account. During the authentication process, the periphery computing device 110 can transmit the one-time access authentication token to the remote authentication manager 122 and receive an authentication token from the remote authentication manager 122 with a defined expiry time. The defined expiry time can be two weeks, three months, one year, or any defined time period.

At block 316, the user computing system 102 receives confirmation of pairing between the periphery computing device 110 and the user account. In some embodiments, the remote authentication manager 122 can communicate with the user computing system 102 over to network to confirm that the authentication and pairing process has been completed, after which the process ends. The user interface of the user computing system 102 can be updated to indicate that the pairing process is complete. In some embodiments, the periphery computing device 110 may provide an audible indication that the process is complete.

Figure 4:
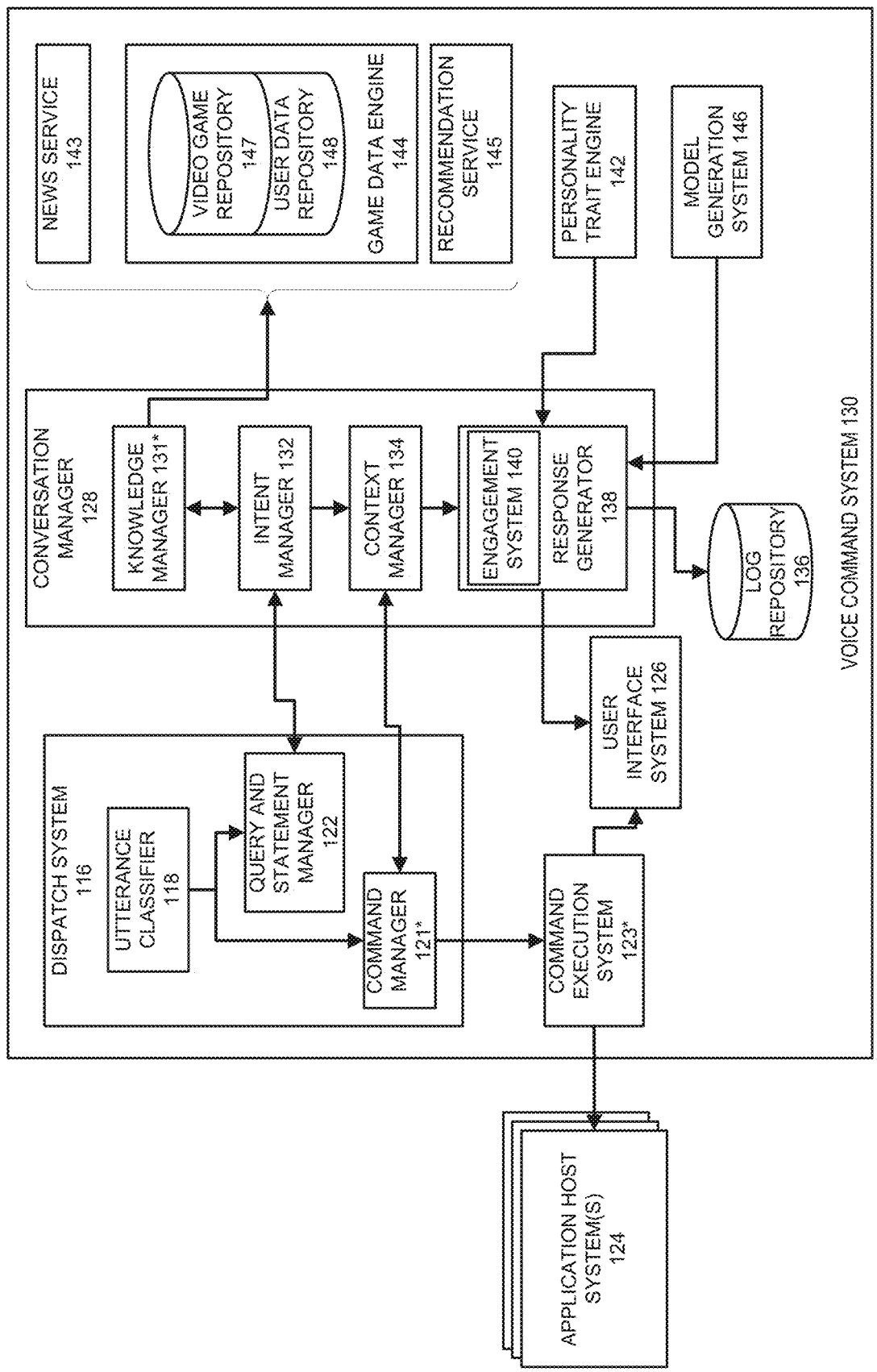
FIG. 4 illustrates an embodiment of a voice command system.

After completion of the pairing of the user account with the periphery computing device 110, the periphery computing device 110 can communicate directly with the interactive computing system 120 in order to provide voice commands to the voice command system 130, as further described with respect to FIG. 4. The user computing system 102 does not need to engage in further audio communication with the periphery computing device 110 in order for the periphery computing device 110 to interact with the user account.

Voice Command System

The voice command system 130 can be configured to perform actions based on audio captured by the audio capture system 112. The audio captured by the audio capture system can be used to perform various actions associated with a user account, a game application 104, an application host system 124, or the companion application 114 as further described herein.

The utterances captured by the audio capture system 112 via the companion application 114 may be provided to a dispatch system 116 of an interactive computing system 120 via the network 104. The dispatch system 116 may include one or more computing systems including one or more hardware processors that can analyze the received utterances to determine one or more actions to perform in response to the utterances. The dispatch system 116 may include a number of subsystems to facilitate responding to the received utterances. For example, the dispatch system 116 may include an utterance classifier 118, a command manager 121, and a query and statement manager 122.

The utterance classifier 118 can determine whether the utterance is a command, a query, or a statement. Further, in certain embodiments, the utterance classifier 118 can determine a priority level of the utterance. Based on the priority level of the utterance, the dispatch system 116 can determine whether to process the utterance, when to process the utterance, or whether to provide the utterance to a secondary computing system (not shown) for processing.

The command manager 121 can process utterances that the utterance classifier 118 has determined to be a command. In some embodiments, certain commands may be preloaded or otherwise recognized by the command manager 121. The command manager 121 may be capable of executing the preloaded commands in conjunction with a command execution system 123. Commands that are not recognized by the command manager 121 may be provided to a context manager 134 at a conversation manager 128. The context manager 134 may identify the command from the utterance and may provide the identity of the command, and in some cases context information for executing the command, to the command manager 121. The command manager 121 may then execute the command in conjunction with the command execution system 123.

The command execution system 123 may execute the command at the game application 104. Executing the command may include identifying an application host system 124 that hosts the game application 104. Further, in some cases, executing the command may include instantiating a headless client to execute the command at the application host system 124. The headless client may execute a portion of the game application 104 that is normally executed at the user computing system 102, such as a client portion of the game application 104, while the server portion of the video game is executed at the application host system 124. The headless client may include or be executed on a computing system that is configured to operate without a monitor or without displaying graphics from the game application 104. The headless client may be controlled or initiated by the command execution system 123. In some cases, once the headless client is initiated by the command execution system 123, it may execute a portion of the game application 104 in conjunction with a portion of the game application 104 hosted by the application host system. The headless client may serve as a substitute for the user computing system 102 and may interact with the application host system 124 to enable execution of the game application 104. Thus, a fully functional instance of the game application 104 may be executed at the headless client or at a combination of the headless client and the application host system 124 without displaying or outputting user interface data including graphics or audio. Advantageously, in certain embodiments, the use of the headless client enables commands referenced in utterances obtained by the companion application 114 to be executed without a user interacting with the game application 104.

A result of executing the command may be output by the user interface system 126. The user interface system 126 may transmit audio, video, or images to the user computing system 102 for presentation to a user via the companion application 114. In some cases, the output may be presented by the game application 104 at the user computing system 102.

Utterances that are determined to not be a command, such as those that are queries or statements, may be provided to the query and statement manager 122. The query and statement manager 122 may include a management system for managing processing of utterances that are queries or statements. The query and statement manager 122 may provide the utterances to an intent manager 132. The intent manager 132 may include a system for determining whether the utterance is a query or statement. Further the intent manager 132 may determine features of the utterance that may indicate a user's state of mind. The user's state of mind may be used for determining how to respond to the user's utterance or what form a response to a user's utterance should take.

The features of the utterance may include characteristics of the utterance that indicate a user's state of mind. These characteristics may be derived from features of an audio or speech signal corresponding to the utterance. The features may be temporal or spectral features of the audio or speech signal. For example, the characteristics may include a tone of the utterance that can be determined from frequency measurements of the utterance. A higher pitch may indicate a greater level of excitement from the user. The features of the utterance can be compared to a baseline for a particular user to account for differences in tone between different users. Further, the baseline for the particular user may be used to determine a difference between an unexcited tone of voice and excited tone of voice for the user.

The conversation manager 128 may further include a knowledge manager 131. The knowledge manager 131 may be used to identify information responsive to a query included in the utterance. The knowledge manager 131 can access one or more knowledge repositories to obtain information responsive to the query. Further, in some cases, the knowledge manager 131 may access one or more additional systems to obtain information responsive to the query. Some non-limiting examples of systems and repositories that the knowledge manager may access to obtain information responsive to the query include a news service 143, a game data engine 144, and a recommendation service 145.

The news service 143 may include any system that can provide news about a game application 104 or a publisher of the game application 104. For example, a user could ask whether there are any new patches being released for a game application 104, whether there is new downloadable content for the game application 104, whether the publishers releasing a sequel to the game application 104, or the like. Further, the news service may include information about promotions relating to the game application 104. These promotions may be for additional products, such as expansions, downloadable content (DLC), or sequels. Alternatively, or in addition, the promotions may be for in-game content, such as discounts on in-game items, discounts on in-game credits, bonus experience points for a limited time, and the like.

The game data engine 144 can include any system that can provide information specific to the state of the game application 104 or the execution of the game application 104. For example, the game data engine 144 may include a video game repository 147 that can provide information on items or playable characters that are available in the game application 104. As another example, the video game repository 147 may provide information about available missions or locations within the game application 104. In some cases, the information provided by the game data engine 144 may be specific to a particular user. For example, the missions available to a user of the game application 104 may be user specific. In some embodiments, the game data engine 144 may also be able to obtain information about one or more application host system 124. For example, the game data engine may determine the load on the difference application host systems 124, whether particular users are online or are on a particular application host system 124, or which application host system 124 may have particular features available for the game application 104.

Further, the game data engine 144 may include a user data repository 148 that provides information specific to the user account of the game application 104. For example, the user data repository 148 may identify characters available to a user of the game application 104, items owned by the user of the game application 104, or credits available to a user of the game application 104. As additional examples, the user data repository may include information about how often a user played the game application 104, how the user's score compares to other users, or any other information relating to the user's interaction with the game application 104.

The recommendation service 145 may include any system that can generate a recommendation related to the game application 104. The recommendation may be associated with the user's access of the game application 104 or playing the game application 104. For example, recommendation may be related to items that a user should attempt to obtain, missions that the user should attempt to play, or a play style that the user should adopt when playing the game application 104. Alternatively, or in addition, the recommendations may relate to other games or applications that a user may be interested in based on the user's play of the game application 104. For example, the recommendation service 145 may recommend other video games that are similar in type to the game application 104, new sources that may interest the user based on the user's interests in game application 104, or upcoming video game conventions that may interest the user.

The conversation manager 128 may further include a context manager 134. The context manager 134 may include any system that can determine commands reference by an utterance. The context manager 134 can identify parameters for executing the command and can provide the parameters to the command manager 121 for executing the command using the command execution system 123. In some embodiments, the context manager 134 can preload or predict commands may be requested by user and can provide parameters or information for executing the command to the command manager 121 in advance of an utterance requesting the command be performed. The commands predicted to be performed may be predicted based at least in part on historical data. In some embodiments commands may be predicted to be performed based at least in part on one or more previous utterances of the user. For example, if the user requests cost information for a particular item, the context manager 134 may predict that the user may request that the item be purchased from an auction house. The context manager 134 may then preload at the command manager 121 an application programming interface (API) call or additional information required for purchasing the item from the auction house. Advantageously, in certain embodiments, by predicting commands and/or preloading information for performing commands at the command manager 121, the responsiveness of the dispatch system 116 can be improved by reducing the latency in executing a requested command.

The conversation manager 128 may generate a response to an utterance using the response generator 138. The response generator 138 may include any system that can generate a response or an utterance. In some embodiments, the response generator 138 may include an engagement system 140 that can evaluate effect on engagement of the user of one or more potential responses to an utterance. The engagement system 140 may apply one or more parameter functions or prediction functions generated using machine learning techniques to predict and impact on engagement of the potential response to an utterance. The parameter functions may be generated using training data by the model generation system 146, which is described in more detail below with respect to FIG. 4.

In some embodiments, the response to an utterance may be modified to reflect a particular personality type. The personality trait engine 142 can modify the utterance to reflect a particular personality that is determined to improve the engagement of the user. For example, if the engagement system 140 determines that a more lighthearted response for a particular user will result in improved engagement compared to a more serious response, the personality trait engine 142 may modify a response generated by the response generator 138 to be more lighthearted. Further, the personality trait engine 142 may insert a joke into the response to the utterance.

A response generated by the response generator 138 may be output by the user interface system 126 to a user computing system 102. Further, the response generator 138 may store utterances received at the dispatch system 116 and responses to the utterances in the log repository 136. Information stored in the log repository 136 may be used to update parameter models for prediction models generated by the model generation system 146.

Although not illustrated, the networked computing environment 100 may further include one or more management or administration computing systems that can be used to interact with the interactive computing system 120. Using the management computing systems, a user, such as administrator, can perform maintenance tasks with respect to the interactive computing system 120. For example, an administrator may update one or more of the knowledge management systems, such as the news service 143, to have access to the latest news related to the game application 104.

Further, although the dispatch system 116 in the conversation manager 128 are illustrated as separate systems, in certain embodiments the dispatch system 116 and/or the conversation manager 128 may be included as part of the game application 104. For example, the conversation manager 128 may be included as part of the portion of the game application 104 hosted by the application host system 124.

Each of the systems illustrated in the networked computing environment 100 may be implemented as computer hardware. However, in certain embodiments, some of the systems may be implemented as software or a combination of hardware and software. For example, the utterance classifier 118 may be software that's implemented by one or more hardware processors of the dispatch system 116.

In some embodiments, the utterances captured by the audio capture system 112 may be used to interact with the game application 104 instead of or in addition to an instance of the companion application 114. For example, the user computing system 102 may capture utterances using an audio capture system 112. These utterances may then be used to interact with the game application 104, such as to command an NPC of the game application 104.

The user computing system 102 may include hardware and software components for establishing communications over a communication network 104. For example, the user computing system 102 may be equipped with networking equipment and network software applications (for example, a web browser) that facilitate communications via a network (for example, the Internet) or an intranet. The user computing system 102 may have varied local computing resources, such as central processing units and architectures, memory, mass storage, graphics processing units, communication network availability and bandwidth, and so forth. Further, the user computing system 102 may include any type of computing system. For example, the user computing system 102 may include any type of computing device(s), such as desktops, laptops, video game platforms, television set-top boxes, televisions (for example, Internet TVs), network-enabled kiosks, car-console devices, computerized appliances, wearable devices (for example, smart watches and glasses with computing functionality), and wireless mobile devices (for example, smart phones, periphery computing device 110As, tablets, or the like), to name a few. In some embodiments, the user computing system 102 may include one or more of the embodiments described below with respect to FIG. 5.

The model generation system 146 can use one or more machine learning algorithms to generate one or more prediction models or parameter functions. One or more of these parameter functions may be used to determine an expected value or occurrence based on a set of inputs. For example, a prediction model can be used to determine an expected engagement level or a probability that a user will continue to play the game application 104 based on one or more inputs to the prediction model, such as, for example, historical user interaction information for a user or historical utterances made by the user. As further examples, a prediction model can be used to determine a retention rate or an expected amount of money spent by the user on purchasing in-game items for the video game based on one or more inputs to the prediction model. In some cases, the prediction model may be termed a prediction model because, for example, the output may be or may be related to a prediction of an action or event, such as the prediction the user continues to play the game application 104. A number of different types of algorithms may be used by the model generation system 146. For example, certain embodiments herein may use a logistical regression model. However, other models are possible, such as a linear regression model, a discrete choice model, or a generalized linear model.

The machine learning algorithms can be configured to adaptively develop and update the models over time based on new input received by the model generation system 146. For example, the models can be regenerated on a periodic basis as new user information is available to help keep the predictions in the model more accurate as the user information evolves over time. The model generation system 146 is described in more detail herein. After a model is generated, it can be provided to the engagement system 140.

Some non-limiting examples of machine learning algorithms that can be used to generate and update the parameter functions or prediction models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

The engagement system 140 can include one or more systems for determining a level of engagement for a user based on the application of user utterances and/or user interaction data for the user to a prediction model generated by the model generation system 146. In some cases, the response generator 138 may use the expected engagement level determined by the engagement system 140 to determine the type of response, the tone of a response, or the information to include in a response to an utterance.

The network 104 can include any type of communication network. For example, the network 104 can include one or more of a wide area network (WAN), a local area network (LAN), a cellular network, an ad hoc network, a satellite network, a wired network, a wireless network, and so forth. Further, in some cases, the network 104 can include the Internet.

Example Hardware Configuration of Computing System

Figure 5:
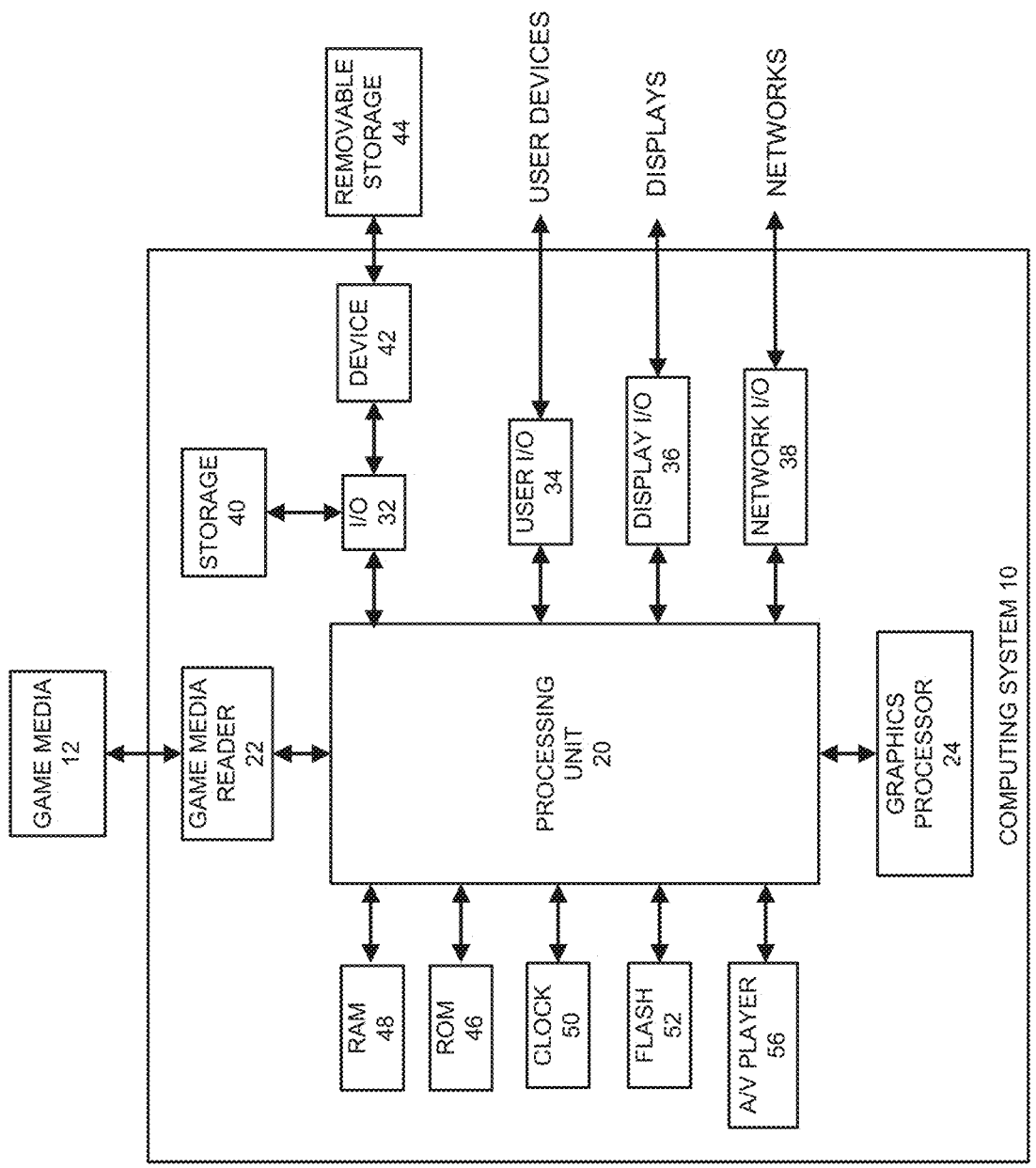
FIG. 5 illustrates an embodiment of a hardware configuration of a user computing system.

FIG. 5 illustrates an embodiment of a hardware configuration for the user computing system 10. Other variations of the user computing system 102 may be substituted for the examples explicitly presented herein, such as removing or adding components to the user computing system 10. The user computing system 10 may include a dedicated game device, a smart phone, a tablet, a personal computer, a desktop, a laptop, a smart television, a car console display, and the like. Further, although not explicitly illustrated in FIG. 5, the user computing system 10 may optionally include a touchscreen display and a touchscreen interface.

As shown, the user computing system 10 includes a processing unit 20 that interacts with other components of the user computing system 10 and also components external to the user computing system 10. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The user computing system 10 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the user computing system 10 may include a discrete graphics processor 24 that is separate from the processing unit 20. In some such cases, the graphics processor 24 may have separate remote authentication manager 122 from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The user computing system 10 also includes various components for enabling input/output, such as an I/O 32, a user I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for the user computing system 10. Processing unit 20 can communicate through I/O 32 to store data, such as game state data and any shared data files. In addition to storage 40 and removable storage media 44, the user computing system 10 is also shown including ROM (Read-Only Memory) 46 and RAM 48. RAM 48 may be used for data that is accessed frequently, such as when a game is being played or for all data that is accessed by the processing unit 20 and/or the graphics processor 24.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the user computing system 10 on a display device, such as graphics, user interfaces, video, and/or other visual content. The user computing system 10 may comprise one or more integrated displays configured to receive display output signals produced by the display I/O 36, which may be output for display to a user. According to some embodiments, display output signals produced by the display I/O 36 may also be output to one or more display devices external to the user computing system 10.

The user computing system 10 can also include other features that may be used with a game, such as a clock 50, flash memory 52, and other components. An audio/video player 56 might also be used to play a video sequence, such as a movie. It should be understood that other components may be provided in the user computing system 10 and that a person skilled in the art will appreciate other variations of the user computing system 10.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state, and/or other data needed or usable for interpreting user input and generating game displays. Generally, RAM 48 is volatile storage and data stored within RAM 48 may be lost when the user computing system 10 is turned off or loses power.

As user computing system 10 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves, increases, or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each is present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
as implemented by a user computing device configured with specific computer-executable instructions,
receiving a first request to initiate a process for pairing a periphery computing device with a user account associated with a video game application;
outputting a first audio output from an audio output system of the user computing device in response to the first request to pair the periphery computing device with the user account, the first audio output configured to request identification data from the periphery computing device;
receiving a second audio output from the periphery computing device, the second audio output comprising identification data identifying the periphery computing device;
transmitting, over a network, an authentication request data packet to a remote authentication manager for a pairing between the periphery computing device and the user account;
receiving, over the network, an authentication response data packet from the remote authentication manager, the authentication response data packet comprising an authentication token;
outputting a third audio output from the audio output system of the user computing device, the third audio output comprising the authentication token, wherein the periphery computing device is configured to communicate with the remote authentication manager and use the authentication token to pair the periphery computing device with the user account; and receiving, over the network, a confirmation data packet from the remote authentication manager, the confirmation data packet indicating pairing of the periphery computing device and the user account is complete.

2. The computer-implemented method of claim 1, wherein the third audio output is machine understandable sounds encoded with audio data representative of the authentication token.

3. The computer-implemented method of claim 2, wherein the machine understandable sounds are audible or inaudible sound waves.

4. The computer-implemented method of claim 2, wherein the machine understandable sounds are encoded with audio data using amplitude modulation, frequency modulation or phase modulation.

5. The computer-implemented method of claim 1, wherein the third audio output is an utterance.

6. The computer-implemented method of claim 1, wherein the authentication token is a one use token having a defined expiry time.

7. The computer-implemented method of claim 1, wherein the third audio output comprises authentication access information.

8. The computer-implemented method of claim 1 further comprising outputting a defined sound prior to the third audio output, wherein the defined sound indicates that transfer of data to the periphery computing device is about to occur.

9. The computer-implemented method of claim 1, further comprising:

after receiving the second audio output, updating a user interface of the user computing system to identify the periphery computing device; and receiving confirmation to proceed with authentication of the identified periphery computing device.

10. The computer-implemented method of claim 9 further comprising providing instructions to update the user interface to indicate completion of the pairing of the periphery computing device with the user account.

11. The computer-implemented method of claim 1, wherein the first audio output identifies an application for installation on the periphery computing device.

12. The computer-implemented method of claim 11, wherein the periphery computing device is configured to download and install the application in memory of the periphery computing device in response to the first audio output.

13. A computing system comprising:
an audio output system;
one or more hardware processors, the one or more hardware processors configured to execute specific computer-executable instructions to at least:
receive a first request to initiate a process for pairing a periphery computing device with a user account associated with a video game application;
output a first audio output from the audio output system of the computing system in response to the first request to pair the periphery computing device with the user account, the first audio output configured to request identification data from the periphery computing device;
receive a second audio output from the periphery computing device, the second audio output comprising identification data identifying the periphery computing device;
transmit, over a network, an authentication request data packet to a remote authentication manager for a pairing between the periphery computing device and the user account;
receive, over the network, an authentication response data packet from the remote authentication manager, the authentication response data packet comprising an authentication token;
output a third audio output from the audio output system of the computing system, the third audio output comprising the authentication token, wherein the periphery computing device is configured to communicate with the remote authentication manager and use the authentication token to pair the periphery computing device with the user account; and
receive, over the network, a confirmation data packet from the remote authentication manager, the confirmation data packet indicating pairing of the periphery computing device and the user account is complete.

14. The system of claim 13, wherein the third audio output is machine understandable sounds encoded with audio data representative of the authentication token.

15. The system of claim 14, wherein the machine understandable sounds are audible or inaudible sound waves.

16. The system of claim 14, wherein the machine understandable sounds are encoded with audio data using amplitude modulation, frequency modulation or phase modulation.

17. The system of claim 13, wherein the third audio output comprises authentication access information.

18. The system of claim 13, wherein the specific computer-executable instructions further configure the one or more hardware processors to output a defined sound prior to the third audio output, wherein the defined sound indicates that transfer of data to the periphery computing device is about to occur.

19. The system of claim 13, wherein the first audio output identifies an application for installation on the periphery computing device.

20. The system of claim 19, wherein the periphery computing device is configured to download and install the application in memory of the periphery computing device in response to the first audio output.

\* \* \* \* \*